United States Patent
Kelley et al.

[15] 3,668,491
[45] June 6, 1972

[54] BATTERY POWERED LIQUIDIZER

[72] Inventors: Raymond F. Kelley, Palm Beach, Fla.; Roy L. Swanke, Newington, Conn.

[73] Assignee: Dynamics Corporation of America, New York, N.Y.

[22] Filed: Oct. 15, 1969

[21] Appl. No.: 866,453

[52] U.S. Cl................................318/305, 318/245, 318/441
[51] Int. Cl.................................................................H02p 7/00
[58] Field of Search..................318/305, 441, 442, 245, 248, 318/252; 307/46, 66

[56] References Cited

UNITED STATES PATENTS

| | | | |
|---|---|---|---|
| 2,482,513 | 9/1949 | Rossignol | 318/252 |
| 3,286,150 | 11/1966 | Wilson | 318/305 |
| 3,257,600 | 6/1966 | Tolmie | 318/441 |
| 3,422,330 | 1/1969 | Swanke | 318/305 |
| 3,525,912 | 8/1970 | Wallin | 318/441 |
| 3,283,227 | 11/1966 | Ulinski | 318/252 |
| 3,493,833 | 2/1970 | Swanke | 318/252 |

*Primary Examiner*—Bernard A. Gilheany
*Assistant Examiner*—Thomas Langer
*Attorney*—Harbaugh and Thomas

[57] ABSTRACT

A portable multi-speed liquidizer operable from low voltage alternating or direct current is speed-controlled by a push button switch assembly, which also serves to select the power source for the liquidizer motor. The maximum current switched by any one contact of the assembly is reduced during speed changes by automatically switching the lowest impedance motor field coil into the circuit immediately preceding and during each speed change.

5 Claims, 12 Drawing Figures

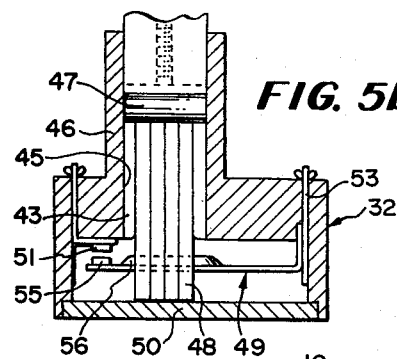
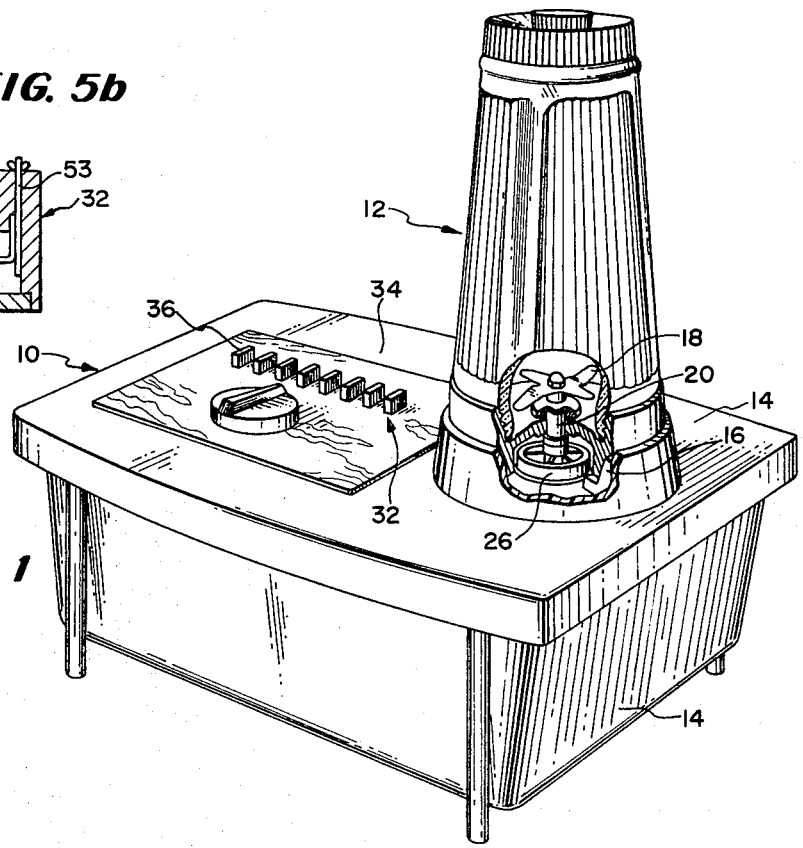
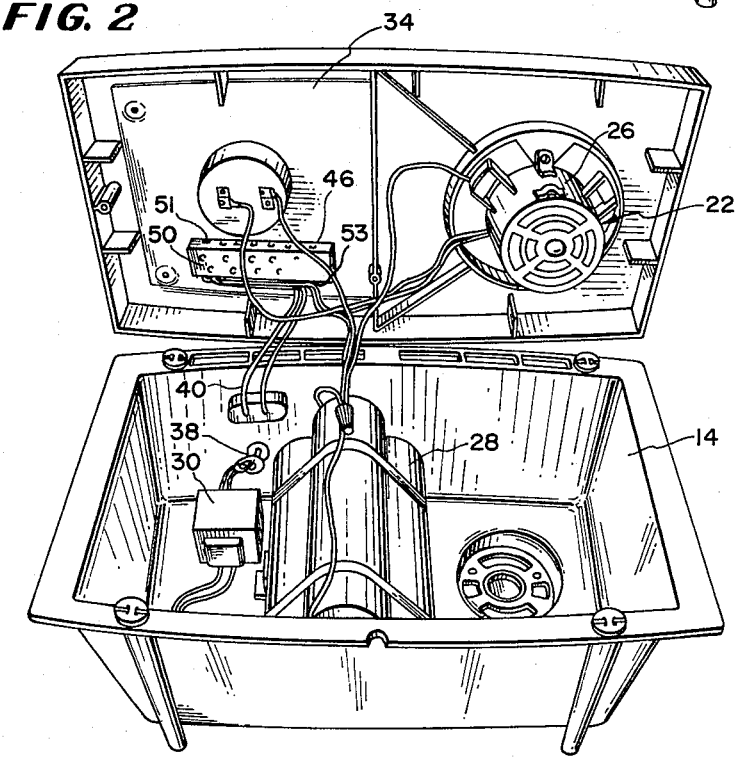
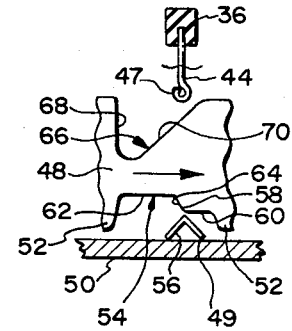
INVENTORS:
RAYMOND F. KELLEY
ROY L. SWANKE
By Harbaugh & Thomas
Attorneys

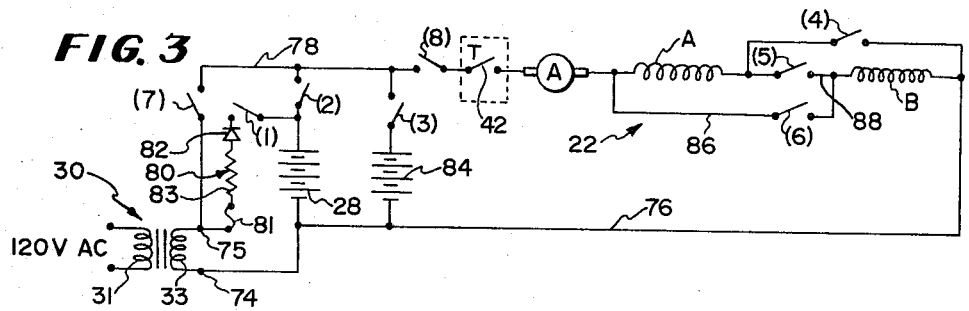

| BUTTONS | SWITCHES | | | | | | | |
|---|---|---|---|---|---|---|---|---|
| | (1) | (2) | (3) | (4) | (5) | (6) | (7) | (8) |
| 1 FIRST SPEED | | | | | ● | | | ● |
| 2 SECOND SPEED | | | | ● | | | | ● |
| 3 THIRD SPEED | | | | | | ● | | ● |
| 4 FOURTH SPEED | | | | ● | | | | ● |
| 5 INTERNAL BATTERY | | ● | | | | | | ● |
| 6 EXTERNAL BATTERY | | | ● | | | | | ● |
| 7 AC OPERATION | ● | | | | | | | ● |
| 8 CHARGE (or) OFF | ● | | | | | | ● | ● |

INVENTORS:
RAYMOND F. KELLEY
ROY L. SWANKE
By Harbaugh & Thomas
Attorneys

BATTERY POWERED LIQUIDIZER

CROSS REFERENCE

Swanke et al, Ser. No. 813,957 which is hereby expressly incorporated herein by reference.

Swanke et al, Ser. No. 766,280 now abandoned, see the divisional application thereof Ser. No. 31,803.

Emmons et al, Ser. No. 850,182

BACKGROUND

A liquidizer can be used for preparation of both food and drinks, but its usefulness heretofore for either one has been confined generally to locations where a source of 120v. a.c. line current is available. However, with the current trend towards outdoor living, demand has developed for a battery powered liquidizer suitable for use at garden parties, on boats and at camping sites where 120v. a.c. line current is not available. It is further desirable that such a liquidizer should be rugged and easily handled, and should provide results similar to those obtained with 120v. a.c. units.

SUMMARY OF INVENTION

A portable garden-camper liquidizer is provided in which a multiple field winding motor, a battery, a battery charger, push button speed control switches, and a timer are permanently provided in a single unit operable selectively from either the a.c. line or 12v. d.c. external or internal batteries. A battery charger circuit is provided to maintain the internal battery at full charge, and to conserve battery power the duration of the running of the motor is automatically limited by the timer to that period of time required to perform a selected liquidizing operation. Novel switching circuitry is provided for permutating the field windings of the motor to different combinations of series and parallel connections to obtain a maximum number of discrete motor operating speeds at the various operating voltages with a minimum number of permutating switch contacts, which contacts are preferably part of a multiple push-button switch assembly such as that fully described in the previously mentioned copending application of SWANKE. This switch function is expanded to select the operating power source for the liquidizer and provide appropriate switching and isolation between the various power sources.

In further accord with the aforementioned Swanke applications, the multiple push-button switch assembly may include a heavy duty contact serially connected in the field coil circuit to interrupt current flow therein while the permutating switch contacts are being activated to reconnect the field coils in a different arrangement, thus limiting the current flow through these contacts to that consumed by the coils instead of the higher current occurring during switching. Alternatively, and in accordance with the invention, the switch assembly can be constructed to momentarily connect the field coil having the lowest impedance during speed permutations, thus reducing the current ultimately switched to a fraction of the total current flow through the field windings. As a result, lighter duty contacts can be used for economy of maintenance and repair.

Moreover with all three power sources available that have been mentioned, any one of them can be used with a switch interlocking system that prevents interconnections between them yet when the liquidizer is "OFF" a continuous charging of the internal battery is provided to assure full power when next used. Also the control and performance of the liquidizer conforms to the habits and recipes developed with liquidizers heretofore by house line currents and is comparable therewith for safety and cleaning as more particularly described in the Emmons et al, patent application filed Aug. 13, 1969.

Other and further objects and advantages appear in the description taken with the embodiments shown in the drawings.

DESCRIPTION OF DRAWINGS

FIG. 1 is a perspective view of a liquidizer and controls embodying the invention including a multiple push button switch for providing different speeds with currents from different power sources;

FIG. 2 is a plan view of the two main housing parts of the embodiment shown in FIG. 1, laid open to show the arrangements of the components and circulation of cooling air;

FIG. 3 is an electrical schematic of a representative circuit embodied in the present invention where the armature is connected electrically to one side of two field coils that in turn are electrically connected in series although physically disposed on opposite sides of the armature;

FIG. 4 is a chart showing one of the speed control arrangements in which the circuit shown in FIG. 3 is employed whereby two groups of speeds are controlled separately for both low voltage alternating current and battery current;

FIG. 5 is a composite view showing the configuration of the speed selector sliders of a push button switch embodying the invention implementing the chart of FIG. 4 with respect to the schematic circuit of FIG. 3;

FIGS. 5a and 5b are enlarged fragmentary views of the push rod, slider and switch constructions embodied in the present invention;

DESCRIPTION

Figure 6:
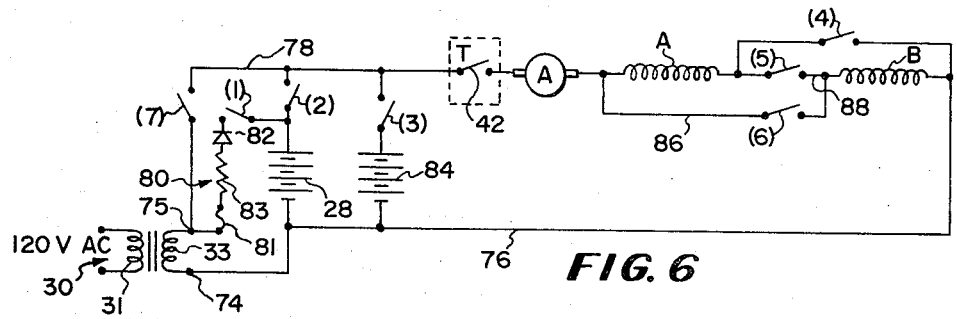
FIG. 6 is an electrical schematic of another circuit embodying the invention in which the timer serves as the "OFF" switch to minimize switching components.

In FIG. 1, a liquidizer 10 embodying the invention is shown which includes a container 12 of the well known cross-sectional clover leaf design of a capacity preferably of less than 2 quarts. The container is supported against rotation in its working position on a housing 14 within four circumferentially spaced resilient studs 16 which mate with the clover leaf design. Cutters 18 are rotatably mounted in the bottom of the container on a shaft 20 journalled in the bottom wall as driven by a series wound motor 22 designed for low voltage currents of approximately 12 volts. The drive between the cutters 18 and the shaft 24 of the motor 22 includes clutch elements 26 having radially intermeshing elements that are separable axially when the container is lifted from its working position as more particularly described in said Emmons et al, application.

The motor has a fan (not shown) which circulates cooling air through the housing 26 over the motor parts and in the housing 24. A multi-cell rechargeable battery, hereinafter referred to as internal battery 28 and, preferably a well known rechargeable type such as nickel cadmium, is mounted within the housing in the path of flow of the cooling air. Also, a step-down transformer 30 for converting conventional house current from 120v. a.c. to approximately 12 volts a.c. at 10 amperes is located in the air stream and is connected in a dual capacity to recharge the battery 28 and also to supply unrectified a.c. electrical power for the motor 22.

Reference is hereby made to the Swanke applications for the general construction and operation of the switching arrangement, it being sufficient to note at this time that the timer switch may be provided with or without a jogger switch as described in Swanke Ser. No. 813,957 and the push button switch 32 may be designed for 8, 9 or 10 push buttons and push rods with no more than eight controlled normally closed switches.

The multiple push button switch 32 is mounted on the liquidizer panel 34 with its push buttons 36 duly labelled as to function as hereinafter described. The switch provides four speeds for the motor sources of electrical current the liquidizer may be powered by. A plug-in extension cord 38 for 120v. a.c. line current is provided as is an extension cord 40 for 12v. d.c. motor vehicle battery operation.

The general construction of push button switch assembly 32 is somewhat conventional in that it has a hollow elongated housing 40 molded of suitable insulating material defining a slider chest 45 which supports a plurality of switch actuating sliders 48 (FIG. 5B) in a manner permitting relative longitudinal reciprocation. The sliders are actuated by vertical push rods 44 slidable in guideways 43 and carry the push buttons 36 on their upper ends and at their lower ends are curled as at 47 to engage the sliders. Eight normally closed field coil permutation and longitudinally reciprocate switches 19 are actuated by appropriately shaped cams on the sliders 48 located below the The permutation switches are formed by one row of stationary terminals having downwardly facing fixed contacts 51 and another row of stationary terminals 53 each resiliently supporting one end of a bridging conductor 56 equipped at its other end with a contact 55 urged to close against a respective one of the fixed contacts 51. A flat cover plate 50 of insulating material is secured to the housing 32 by suitable means to close the switch chamber with sufficient clearance to permit operation of the bridging conductors 56 and support the sliders with respect thereto, as more particularly described in Swanke Ser. No. 813,957.

All sliders 48 are made of insulating phenolic board and are supported by extensions 52 spaced along their lower edges and slidably bearing against the cover plate 50 (FIG. 5A) to carry the downward thrust of the push rods 44 actuating them. Between successive extensions 52 the sliders have recesses 54 at each switch station indicated by the conductor 56 and are provided with various shapes including cams 58 to operate or not operate the conductors as their permutation requires. If a conductor 56 is to be actuated at a particular recess, the recess is provided with a cam contour having a short high dwell 60 and a long low dwell 62 separated by a cam incline 64 which either closes the switch or opens it depending upon the relative location of the conductor and the direction of movement of the slider when actuated. Thus, when a switch 49 is open the corresponding recesses 54 of the sliders are so arranged with respect to the switch conductors 56 that one or more high dwells 60 of those present at that station engages the conductor to hold the switch open in a downward direction, and when a switch is to be closed the low dwells 62 in all recesses 54 at that station coincide to permit the resilient conductor 56 to rise and close the contacts 51 and 55.

Figure 8:
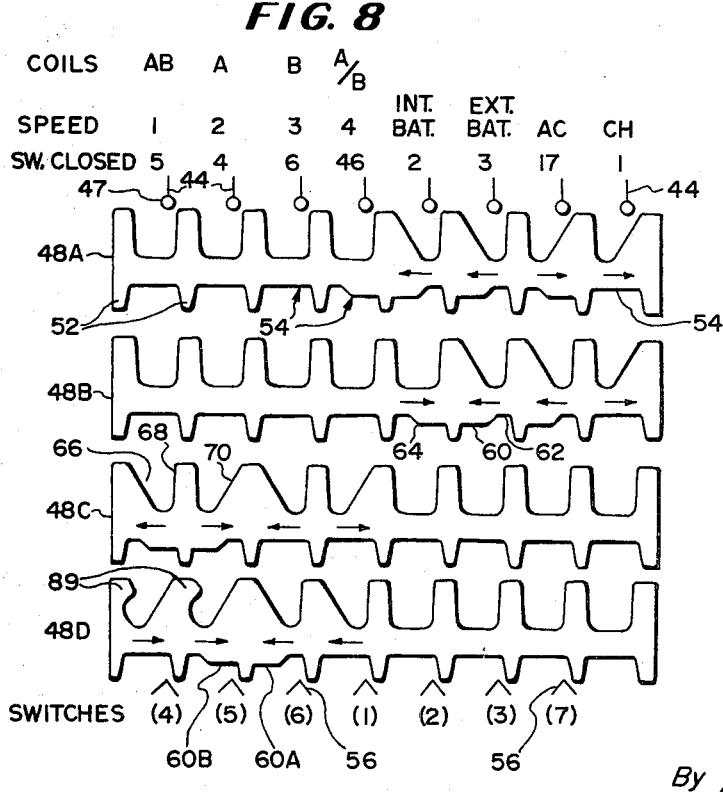
FIG. 8 is a view similar to FIG. 5 and indicates the speed permutation slider construction for operating the circuit of FIG. 6 according to the chart of FIG. 7.
Figure 9:
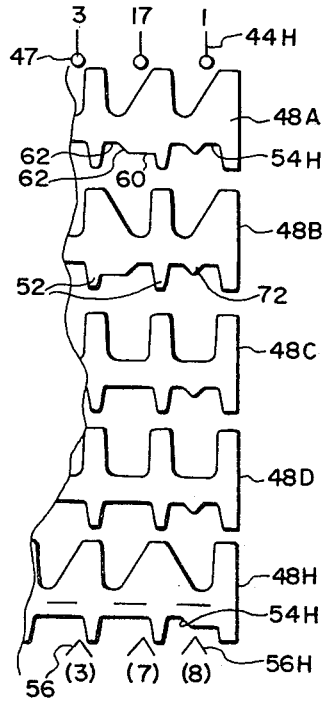
FIG. 9 is a segmental view of an added slide bar modification of FIG. 8 in which an "OFF" switch is included in the push button switching permutation for operation as shown in FIG. 7A.

For permutation of the sliders 48 and thereby field coil permutation switches, the upper edges of the sliders have notches 66 for each push rod 44. The notches generally define a vertical side 68 and a side inclined thereto to provide an actuated cam 70 for moving the slider in the direction indicated by the arrows. In FIGS. 5, 8 and 9 full sliders are shown as described and arrows indicate the slider movement induced by the push rods at each notch 62 station.

The switches are identified by numerals (1) to (8), the speeds by numerals 1 to 4, and the field coils by letters A and B. Coil B has the lower impedance of the two.

Referring to FIGS. 3 and 6 two circuits are diagrammatically shown for reducing the amount of current which must be switched by the field coil permutation contacts. The circuit in FIG. 3 utilizes a heavy-duty switch (8) incorporated in the push button switch assembly and activated open by actuation on any of the speed selection push buttons to break the motor field circuit during speed changes. This is accomplished by the long low dwells 62A of the permutation switches in combination with the protuberances 72 in all the permutation slider recesses 54H located at the No (8) switch station which force switch (8) to open when any one of speed selection push buttons is actuated.

Figures 7, 7A:
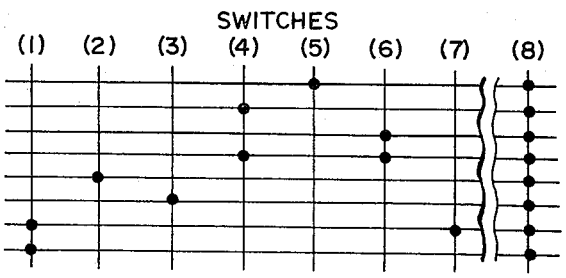
FIGS. 7 and 7A are segmented views of two charts similar to that shown in FIG. 4 wherein a full speed range control is provided for each source of current in a pushbutton switch for dual actuation of switches for each speed with respect to the circuits of FIGS. 6 and 3 respectively.

In accordance with the invention the circuit in FIG. 6 saves the expense of a heavy-duty switch by incorporating in the push button speed selection switch means for momentarily closing switch (6) while the field winding interconnections are being permutated. This connects the lowest impedance field coil in the circuit and thus limits the current to be switched to a fraction of what it would be. Specifically, this sequence of switch operation is accomplished in the circuit of FIG. 6 by the short high dwell 60A indicated in FIG. 8 for switch (6) in combination with the longer lengths of the other high dwells 60B. The field coil combinations of A and B may be permutated for four discrete speed increments as shown in FIGS. 4 and 7, namely AB (series), A (alone), B (alone) and A/B (parallel) by the three switches (4), (5) and (6). Switch 6, associated with the third discrete speed (b), was selected to momentarily close during each permutation change since field coil B has the lowest impedance and therefore draws the most current that can be controlled by a single switch in this combination of three switches. It is less damaging to the permutation switch contacts to close a circuit than to break a circuit carrying direct current and this arrangement minimizes the differential of current potential that would be broken any one permutation contact when changing from a higher speed to a speed lower than third (B coil only) speed. Opening switch (6) quickly after switch (4) has been closed for second (A coil only) speed permits break of switch (6) at a low current differential. Otherwise switch (6) is closed with all other speeds where the other switches, if not already closed, close to make contact. Only in going from fourth speed (A/B) to a lower speed would another switch break a partial current.

As shown in both FIGS. 3 and 6 the primary 31 of the transformer 30 is designed for plug-in connection with a house current of 120v. a.c. and the secondary 33 provides at terminals 74 and 75 a voltage potential of approximately 12v. a.c. The secondary terminal 74 is connected to common lead 76 for all components that are to be included. The other terminal 75 is connected in series with the timer switch 42 and motor 22 through individual switches to the other sides of the components. One of the components is the internal battery 28 which is connected by switch (2) through connection 78 to the timer. Another component is the charging circuit 80 which includes a low amperage fuse 81, a bleed resistor 83, a low wattage half wave rectifier 82, and a switch (1) connected in series with the battery 28 at a junction inside the switch (2) connection leading to the battery. The diode 82 and battery 28 are poled for charging when the switch (1) is closed.

The secondary 33 of the transformer serves as another component, namely the low voltage a.c. source. For this purpose it is connected by switch (7) to the connection 78. A 12-volt external storage battery 84 is connected by switch (8) to the connection 78.

In FIG. 3 the connection 78 includes the heavy-duty switch (8) in series with the timer switch 42. The switch (8) can be automatically controlled in the multiple push button switch assembly and can serve as a jogging switch as described in said Swanke et al application Ser. No. 813,957.

Since the motor 22 is series wound, having an armature and a dual pole stator with field coils A and B connected therewith in series electrically on one side of the armature, the armature end of the coil B can be directly connected to the armature by connection 86 through switch (6) and by connection 88 in series with coil A through switch (5). The end of coil A that is electrically remote from the armature is connected directly to the common lead 76 by switch (4) whereby closure of switches (6) and (4) places the coils in parallel; closure of switch (5) alone places the coils in series; and closure of either switch (5) or (6) places only one of the coils, A or B, respectively, in the circuit.

The timer is designed to provide a maximum period of one minute and is calibrated in seconds for shorter periods. It makes and breaks the circuit to start and stop the motor when the switches described are operated as will now be described, and where the main switch (8) is employed its operation is coordinated with the operation of the switches (4), (5) and (6).

The operation of the switches (2) through (7) are shown in FIGS. 7 and 8 as taken in connection with the four push button switch sliders 48A, 48B, 48C and 48D.

In the switching pattern one or more of the switches (4), (5) and (6) are involved each time and as controlled by sliders 48C and 48D such provides a novel pattern already mentioned in which one switch (5) interconnects the B and C coils at their electrically adjacent ends, another switch (6) connects one of these ends to the armature R, and the third switch (4) connects the other one of these ends to a power source.

Switch (4) is never closed with switch (5) closed and switch (5) is never closed with switch (6) closed, but switches (4) and (6) can be closed concurrently. The upper slider 48C cams switch (4) open while closing switch (5) when moved in one direction indicated by the left directed arrows, and opens switch (5) while closing switch (4) when moved in the other direction indicated by the arrows directed to the right. The lower slider 48D closes switch (5) when switch (6) is opened with right hand movement of the lower slider and closes switch (5) when switch (4) is open with left hand movement, thereby providing a switch permutation pattern of (5), (4), (6) an (46) which in turn involves coil permutations AB, A, B and A/B. This relation is a building block for switch circuit patterns and slide permutation control thereof.

This relation is essentially repeated for the upper two sliders 48A and 48B with respect to switches (1), (2) and (3) at their station, as modified slightly to also include switch (7). Switches (1), (2) and (3) are permutated by their cam arrangements to switch in and out the internal battery 28, the external battery 84, and the a.c. source 33 without cross interference. Switch 1, which connects the internal charging circuit comprising transformer 31 and diode 82 to the internal battery 28, is closed by appropriate camming on sliders 48A and 48B whenever the A.C. OPERATION or OFF operating modes are selected, which correspond to push buttons 7 and 8, respectively. Thus selective power sources and a continuous recharge are provided whenever the cord is plugged into a house current of 120v. a.c.

In the slider cam arrangement shown in FIG. 8 it is to be noted that a dual switching pattern is accomplished since the push rods for sliders 48A and 48B do not interfere with the push rods of the other pair of sliders 48C and 48D. This is because there are no cams 58 nor inclines 64 in the recesses 54 and notches 66 of one pair of sliders corresponding to those present in the other pair of sliders. Thus, two buttons can be "down" at the same time to indicate what speed and power source is involved.

The momentary closing of switch (6) when a speed change is made is accomplished by oscillating the permutation switch sliders 48C and 48D. This occurs by the reaction of the nodules 89 that are provided on the vertical sides 68 of the notches 66 when engaged by the push rods 44 for switches (4) and (5). The nodules thereby operate to lower the conductor 56 of switch (6) from off of the short high dwell 60A to its closed position when either switch (4) or (5) is being opened by slider action.

In FIGS. 5 and 9 which show a preferred slider and cam arrangement for the circuit of FIG. 3, a fifth slider 48H has been added to operate the heavy-duty switch (8). As more extensively shown in FIG. 5 any action of the push rods 44 other than push rod 44H for CHARGE position will move the slider to the right to close the switch (8) and thereafter whenever any of the four sliders is moved the protuberance in recesses 54H will open the switch (8) while a permutation of the speed switches is being changed.

Otherwise the characteristics of the four sliders 48A, 48B, 48C and 48D of FIG. 5 are substantially the same as those described in connection with FIG. 8. The permutation arrangement of the cams 58 of sliders 48C and 48D for switches (4), (5) and (6) are repeated for switches (1), (2) and (3) for sliders 48A and 48B except for the direction of slider movement indicated by arrows in the notches for switch (7) and adjacent notches above and to the right and below and to the left as noted from a comparison of arrows for these four notches. These differences indicate the versatility of applicants' circuit which discrete motor speeds operating with only three switches, and with additional switches four interlocked modes of operation, i.e., utilizing an inside battery, an outside battery, and a low voltage a.c. power source, and recharging the inside battery.

What is claimed is;

1. In a speed control for a fractional horsepower universal motor having at least two field coils of different impedances, the combination of:
    a first connection including a first switch having a movable conductor between two of the coils to connect the coils in series,
    a second connection between the two coils including a second switch having a movable conductor to shunt one of the coils and said first switch,
    a third connection between the two coils including a third switch having a movable conductor to shunt the other of the coils and said first switch,
    means comprising a plurality of push buttons for controlling said movable switch conductors to establish different interconnections between said field coils one of said push buttons closing said second and third switch conductors and opening said first switch conductor concurrently,
    and means for momentarily closing said second switch conductor while either one of the other switch conductors is being closed to reduce the maximum current being switched by said conductors.

2. The combination called for in claim 1 in which one of the push buttons opens said second and third switch conductors and closes said first switch conductor concurrently.

3. The combination called for in claim 2 in which another push button of said switch control means controls said switch conductors to close the second switch while opening said first and third switches.

4. The combination called for in claim 2 in which another push button of said switch control means controls said switch conductors to close the third switch while opening said first and second switches.

5. The speed control described in claim 1 wherein said permutating switch contacts are ra ted to carry only the current consumed by said coils, and
    said second connection shunts the field coil having the higher impedance.

* * * * *